United States Patent [19]

Allen

[11] 3,965,923

[45] June 29, 1976

[54] SOLENOID VALVE

[75] Inventor: Walter E. Allen, Prospect, Conn.

[73] Assignee: Peter Paul Electronics Co., Inc., New Britain, Conn.

[22] Filed: Aug. 16, 1974

[21] Appl. No.: 498,089

[52] U.S. Cl.............................. 137/315; 137/454.6; 137/625.5; 251/129
[51] Int. Cl.²........................................ F16K 11/02
[58] Field of Search............ 137/315, 454.6, 625.27, 137/625.5, 625.64, 625.65; 251/129, 138, 141

[56] References Cited
UNITED STATES PATENTS

| | | | |
|---|---|---|---|
| 2,826,215 | 3/1958 | Wolfslau et al.................. | 137/454.6 |
| 2,886,063 | 5/1959 | Ray............................... | 137/625.5 X |
| 2,916,051 | 12/1959 | Taylor............................ | 137/625.64 |
| 2,916,252 | 12/1959 | Hobbs et al.................... | 137/625.25 X |
| 3,102,712 | 9/1963 | Zilk................................ | 251/138 X |
| 3,313,317 | 4/1967 | Mosier........................... | 251/138 X |
| 3,329,168 | 7/1967 | Vollmer.......................... | 137/625.65 |
| 3,523,676 | 8/1970 | Barker........................... | 251/141 |
| 3,565,111 | 2/1971 | Pearson......................... | 137/315 X |
| 3,683,962 | 8/1972 | Good.............................. | 251/138 X |
| 3,840,047 | 10/1974 | Gibbins......................... | 137/596.15 X |

FOREIGN PATENTS OR APPLICATIONS

| | | | |
|---|---|---|---|
| 50,537 | 12/1940 | France............................ | 137/625.65 |
| 1,298,101 | 5/1962 | France............................ | 137/625.5 |
| 546,388 | 7/1956 | Italy................................. | 137/625.27 |
| 977,084 | 12/1964 | United Kingdom........... | 137/625.27 |

Primary Examiner—Alan Cohan
Assistant Examiner—Gerald A. Michalsky
Attorney, Agent, or Firm—McCormick, Paulding & Huber

[57] ABSTRACT

A solenoid-actuated four-way fluid control valve assembly has a body assembly mounting a pair of solenoids and defining two valve chambers each containing an axially elongated generally L-shaped plunger assembly and a pair of valve seats. Each plunger assembly is spring biased to closing engagement with one of the valve seats and is shiftable axially to another position to open the one valve seat and close the other in response to energization of an associated one of the solenoids. A transfer plate mounted on the valve body determines flow paths through the valve assembly and carries needle valves for selectively regulating flow in each of the latter paths. The two plunger assemblies, the biasing springs therefor, and a cartridge which provides a closure for the two valve chambers comprise a cartridge assembly which may be removed from the valve body as a unit to facilitate repair or replacement of operational parts of the valve assembly.

24 Claims, 10 Drawing Figures

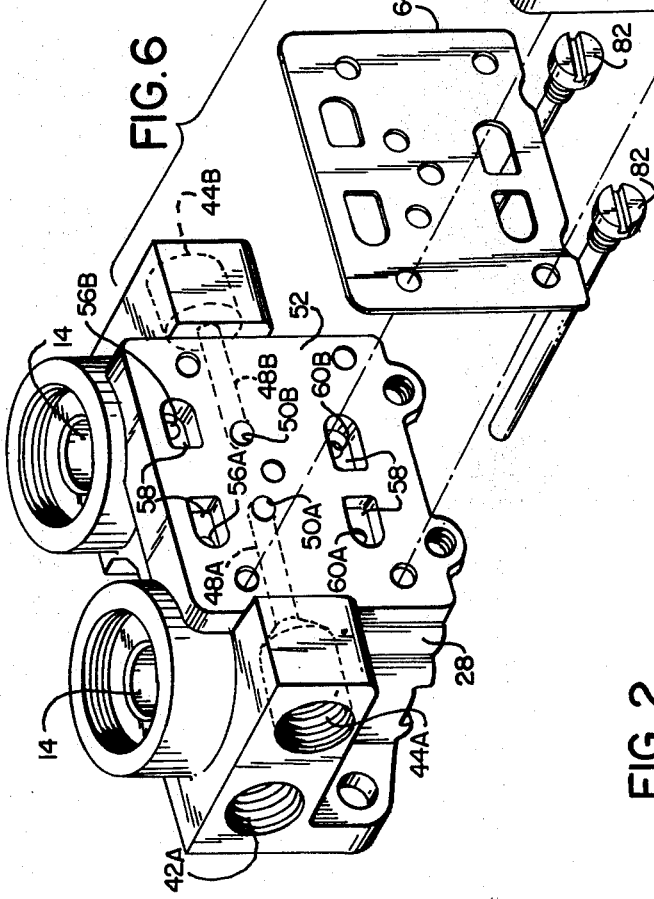
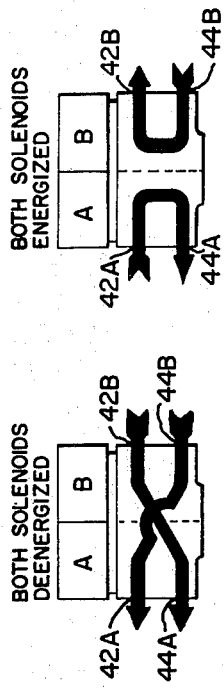
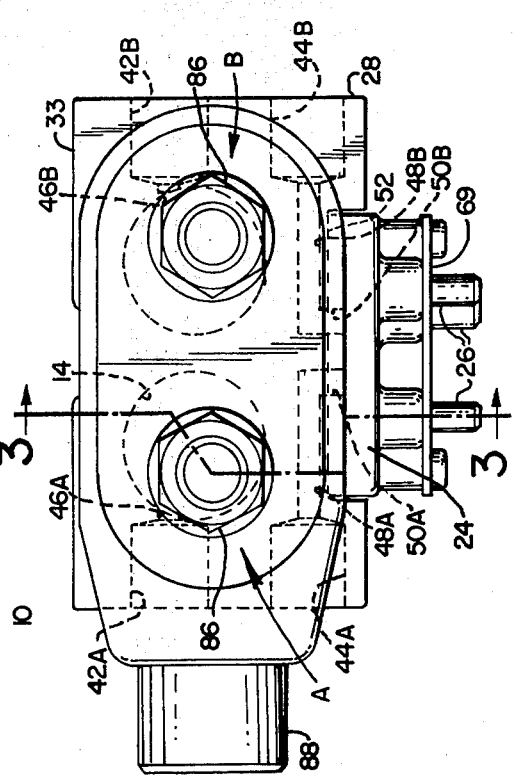
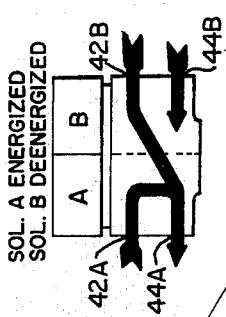
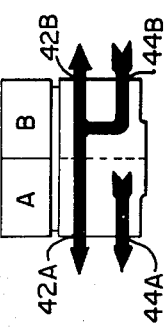

SOLENOID VALVE

BACKGROUND OF THE INVENTION

This invention relates in general to solenoid valves and deals more particularly with improved multiple-way solenoid actuated control valves.

Conventional valves of the aforedescribed type generally have at least one cylindrical plunger supported in a bore and shiftable axially thereof between valve seats associated with opposite ends of the plunger. In such a structure, a portion of the plunger bore necessarily defines at least a part of a flow path through the valve. The latter flow path may, for example, be at least partially defined by slots in the plunger which extend longitudinally thereof. However, such arrangement tends to increase frictional forces within the valve and may impose limitations on valve operational speed. Accordingly, the general aim of the present invention is to provide an improved multi-way solenoid actuated control valve wherein the valve plunger bore does not define a portion of a flow path through the valve. The further aim of the invention is to provide an improved valve assembly which may be rebuilt in place, that is, while the valve assembly is mounted on associated equipment without requiring disconnection of the various fluid and electrical conduits connected thereto and which includes improved arrangement for metering flow in various flow paths therethrough.

SUMMARY OF THE INVENTION

In accordance with the present invention, an improved solenoid-actuated control valve assembly is provided which comprises a body assembly having at least one chamber containing a pair of opposing valve seats and a plunger assembly axially shiftable between one and another position relative to the body. The plunger assembly has a generally radially outwardly extending portion which is disposed between the valve seats for alternately engaging and closing one or the other of the valve seats. Means is provided for biasing the plunger to and normally retaining it in one of its positions to close one of the valve seats and yieldably resist shifting to its other position to close the other of the valve seats in response to operation of the solenoid. The plunger assembly, the biasing means and one of the valve seats may comprise part of a cartridge assembly which is removable from the valve body as a unit to facilitate the repair or replacement of operational parts. When the valve assembly is provided with two valve chambers means may be provided for metering fluid flow in the paths therebetween.

BRIEF DESCRIPTION OF THE DRAWINGS

FIG. 2 is a plan view of the valve of FIG. 1.

FIG. 6 is an exploded perspective view of parts of the valve body assembly.

FIGS. 7–10 are schematic views which illustrate operation of the valve assembly.

DETAILED DESCRIPTION OF THE PREFERRED EMBODIMENT

Figure 1:
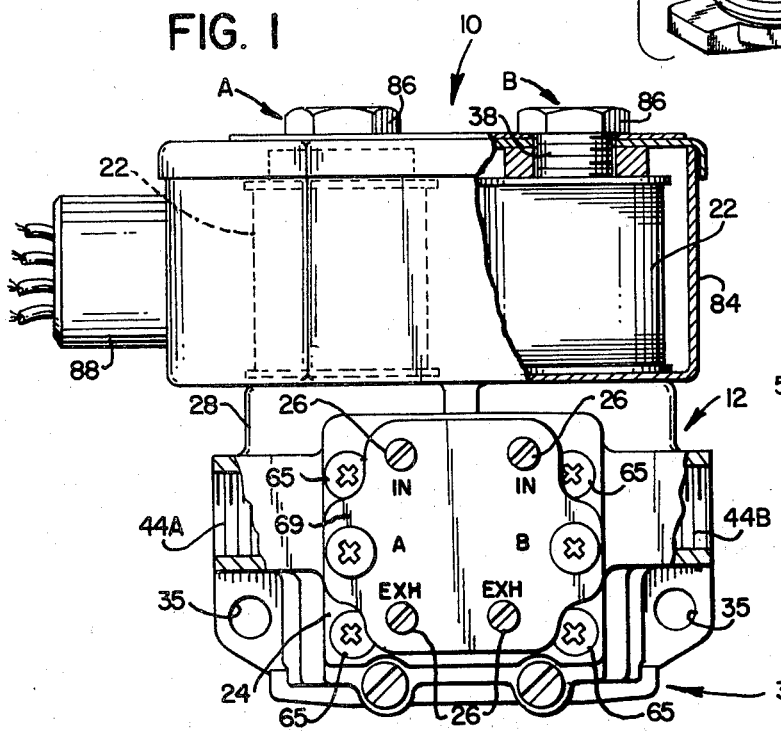
FIG. 1 is a front elevational view of a solenoid actuated four-way valve assembly embodying the present invention.

Turning now to the drawings, and referring particularly to FIGS. 1–3, the present invention is illustrated with reference to a solenoid actuated four-way fluid control valve assembly indicated generally by the reference numeral 10. The valve assembly 10 is particularly adapted for use in a pneumatic or hydraulic system and generally comprises a pair of substantially identical solenoid valves designated A and B which have a common body assembly indicated generally at 12. Each of the valves A and B has a chamber 14 which contains an associated plunger assembly 16 and a pair of opposing valve seats 18, 18. The plunger assembly 16 includes an axially elongated plunger portion and a radially outwardly extending portion which is disposed between the valve seats and has seating surfaces thereon for alternately engaging one and the other of the valve seats 18, 18. It is shiftable axially of the chamber 14 between one and another position and is biased to and normally retained in one of its positions by a compression spring, such as the spring 20, to close an associated one of the valve seats and yieldably resists shifting to its other position. A solenoid 22 mounted on the body assembly 12 is energized to shift the plunger assembly 16 from one to the other of its positions against the biasing force of the spring 20. A transfer and metering plate 24 comprises a part of the body assembly 12 and partially defines passageways therethrough which communicate with the chambers 14, 14 of the valves A and B to establish predetermined fluid flow paths through the valve assembly 10. Metering valves 26, 26 associated with the plate 24 may be selectively adjusted to regulate fluid flow in the various flow paths through the valve assembly 10, as will be hereinafter further discussed.

Considering now the common body assembly 12 in further detail, it comprises a valve body 28, the transfer and metering plate 24, a valve cartridge indicated generally at 30, and a pair of solenoid supporting sleeves 32, 32. The valve body 28 is preferably die cast from zinc or like material and, as viewed in FIGS. 1 and 6, is generally symmetrical about a vertical median plane which passes transversely therethrough, that is, the right-hand half of the valve body 28 is a substantial mirror image of the left-hand half thereof. Integral mounting pads at the rear of the valve body 28 generally define a rearwardly facing mounting surface 33 (FIG. 2) and have fastener receiving openings 35, 35 therethrough, best shown in FIG. 1. A pair of generally cylindrical stepped bores 34, 34 which open downwardly through the lower end of the valve body 28 partially define the chambers 14, 14. Each chamber is further defined by another somewhat smaller bore 36 of relatively short axial extent, in the upper end of the valve body 28, which communicates with an associated bore 34 and which is radially offset therefrom. Each chamber 14 is further defined by an associated solenoid supporting sleeve 32. The latter sleeve is made from non-magnetic material and has a diametrically enlarged flange at its lower end threaded into the upper end of the valve body 28 in coaxial alignment with an associated bore 36, as best shown in FIG. 2. The sleeve 32 comprises a generally cylindrical thin-walled tubular shell which projects upwardly from the valve body 28 and forms an upward extension of the bore 36. A plug 38 of magnetic material is welded or otherwise fixedly secured in the upper open end of the tubular sleeve and has an external thread at its upper end. The upper valve seats 18, 18 comprise stainless steel inserts respectively mounted in the valve body at the upper ends of the bores 34, 34.

Internally threaded in-line ports 42A, 42B and 44A, 44B, open through opposite ends of the valve body 28 to facilitate connection of the valve assembly 10 with fluid conduits in an associated pneumatic or hydraulic system. A plurality of passageways formed in the valve body 28 cooperate with other passageway defining means in the valve cartridge 30 and in the metering plate 24 to define various flow paths through the valve assembly 10. The passageways in the valve body associated with the valve A are hereinafter described.

Figure 3:
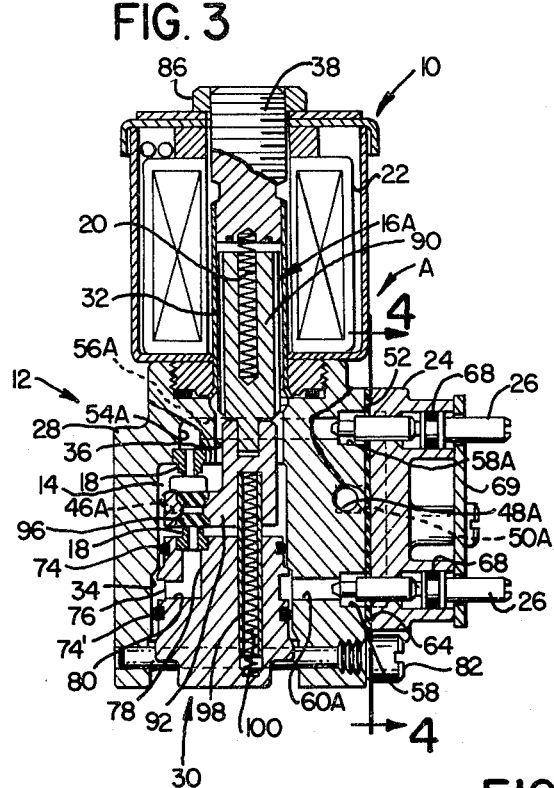
FIG. 3 is a sectional view taken generally along the line 3—3 of FIG. 2.

A passageway 46A extends inwardly from the inner end of each port 42A and opens through the wall of the bore 34 as best shown in FIGS. 2 and 3. Each port 44A has an associated passageway 48A which extends longitudinally inwardly therefrom and intersects a transverse passageway 50A which opens through a frontal surface 52 of the valve body 28. Another passageway 54A communicates with the upper valve seat 18 and intersects a transverse passageway 56A which opens through the frontal surface 52, as best shown in FIG. 3. The passageway 56A terminates at a recess 58 which opens through the frontal surface 52. Another passageway 60A formed in the lower frontal portion of the valve body 28 opens into the lower end of the bore 34 and communicates with another recess 58 which opens through the frontal surface 52. Each of the recesses 58, 58 has a forwardly facing seating surface at its inner end, as best shown in FIGS. 3 and 6. A plurality of substantially identical passageways formed in the right-hand half of the valve body 28 are associated with the valve B and, for convenience, are designated by the same numerals and a letter B suffix.

Figure 4:
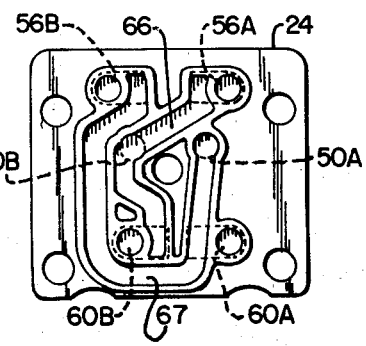
FIG. 4 is a sectional view taken along the line 4—4 of FIG. 3.

Fluid communication between the chambers 14, 14 is provided by the transfer and metering plate 24, which is preferably die cast from zinc or like material and secured in fluid tight engagement with the frontal surface 52 by a gasket 64 and a plurality of fasteners 65, 65. Serpentine recesses 66 and 67 formed in the metering plate 24 opens through the rear surface thereof, as best shown in FIG. 4, and cooperate with the frontal surface 52 and the various openings therethrough to define selected flow paths through the valve assembly 10. In FIG. 4, the rear surface of the metering plate 24 is shown, the various passageways associated with the frontal surface 52 being superimposed thereon and shown in broken lines. The recess 66 communicates with the inlet opening 50B and the passageways 56A and 60B. In generally like manner, the serpentine passageway 67 communicates with the opening 50A and the passageways 56B and 60A. The metering or needle valves 26, 26 are threaded into the metering plate 24, have tapered inner ends which respectively cooperate with the seating surfaces at the inner ends of the recesses 58, 58, and are accessible externally of the valve assembly 10 to regulate or meter flow in the various flow paths through the valve assembly 10. Each needle valve carries an O-ring 68 which is engaged in a cylindrical opening in the metering plate to provide a liquid tight seal therewith and to frictionally resist rotation relative thereto, whereby the various needle valves 26, 26 may be adjusted to and retained in selected regulating position to produce desired metered flow through the ports 42A, 42B and 44A, 44B. A nameplate 69 mounted on the metering plate 24 has port indicia thereon to indicate the ports controlled by the various needle valves 26, 26 as shown in FIG. 1.

Figure 5:
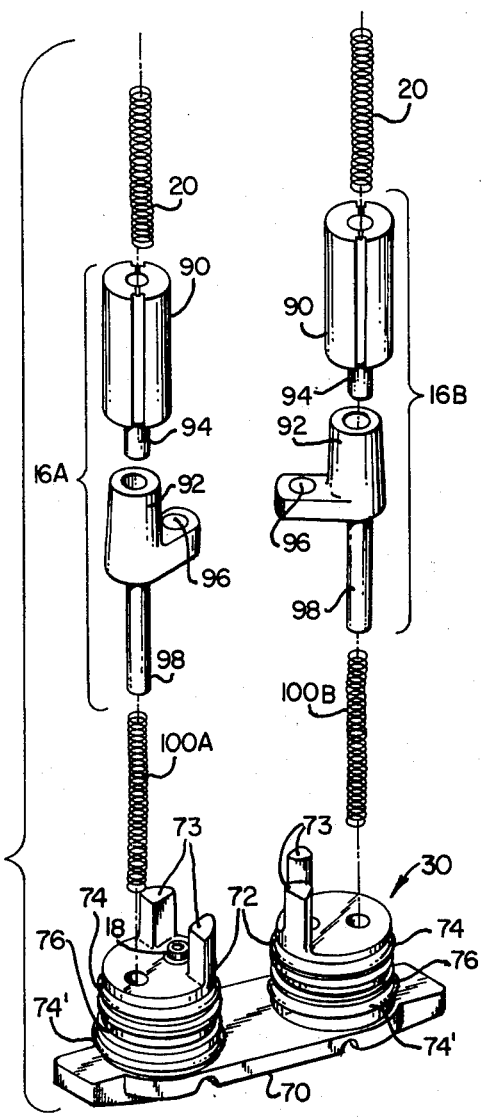
FIG. 5 is an exploded perspective view of the valve cartridge assembly.

The valve cartridge 30 is also preferably die cast from zinc or like material and comprises a base portion 70 which carries a pair of spaced apart upwardly extending generally cylindrical portions 72, 72. Each cylindrical portion 72 is received in an associated bore 14 to provide a fluid tight closure therefore and has a pair of integral plunger arm guides 73, 73 which extend upwardly therefrom. Each cylindrical portion 72 has a pair of axially spaced annular recesses formed therein which contain O-rings 74, 74' for sealing engagement with an associated bore 14, as best shown in FIG. 3. An annular recess 76 formed in each cylindrical portion intermediate the O-rings 74, 74' further defines an associated one of the fluid passageways through the body assembly 12. Each cylindrical portion 72 also carries a lower valve seat or insert 18 which is preferably made from stainless steel and positioned generally between plunger arm guides 73, 73, as illustrated in FIG. 5. A passageway 78 communicates with each lower insert 18 and extends downwardly through each cylindrical portion 72 to intersect another passageway 80 which extends radially inwardly from the recess 76, as best illustrated in FIG. 3. The cartridge 30 is releasably retained in assembly with the valve body 28 by a pair of retaining screws 82, 82 which threadably engage the valve body and extend transversely thereof generally below the base portion 70.

The solenoids 22, 22 are contained within a housing 84 mounted on the upper end of the valve body 28. Each solenoid is received on and generally surrounds an associated sleeve 32. Nuts 86, 86 threaded on the upper ends of the plugs 38, 38 retain the solenoids and the housing 84 in assembly with the valve body 28. The housing 84 has an internally threaded connector 88 at one end thereof to facilitate connection of the solenoids to an electrical conduit. In FIGS. 1 and 2, the connector 88 is shown arranged for left-hand connection, however, the housing 84 may be assembled with the valve body in a reverse position to facilitate right-hand conduit connection.

Considering now the plunger assembly 16 in further detail and referring particularly to FIGS. 3 and 5, each plunger assembly 16 is preferably formed from two parts and includes a generally cylindrical plunger 90 and a plunger arm 92. The plunger 90 is made from magnetic material and has an upwardly opening spring receiving bore and a downwardly projecting shank 94. A pair of grooves formed in the peripheral surface of the plunger 90 provide fluid flow passages between the plunger and an associated sleeve 32 whereby to lubricate the plunger for sliding movement in the sleeve. The plunger arm 92 is preferably die cast from zinc or like material and has an upwardly opening bore which loosely receives the shank 94 whereby the plunger and plunger arm are retained in loosely connected coaxial end-to-end relation for axial movement relative to each other. The lower end portion of the arm extends radially outwardly and carries a resilient insert 96 made from synthetic rubber or other suitable material compatible with the fluid to be controlled and defines seating surfaces on the arm 92 for respectively engaging associated upper and lower valve seats 18, 18. The plunger arm 92 also includes a guide tube 98 which extends downwardly therefrom and is received in a guide bore in the cylindrical portion 72, as best shown in FIG. 3.

Referring now particularly to FIGS. 3 and 5, each plunger assembly 16 has a plunger spring and a cartridge spring associated therewith. The plunger spring is received within the plunger bore and acts between the plunger 90 and the plug 38 whereas the cartridge spring is received within the guide tube and acts between the plunger arm 92 and the valve cartridge 30. The plunger springs, designated 20, 20, are substantially identical and may, for example, exert biasing force of approximately 28 ounces. However, the cartridge spring in the valve A, designated 100A, may comprise a 20 ounce spring whereas the cartridge spring in the valve B, designated 100B, may be a somewhat lighter spring which may exert a 6 ounce biasing force.

In the illustrated embodiment 10, the valve A is normally open whereas the valve B is normally closed. When both solenoids are deenergized each plunger assembly 16A and 16B is biased into seating engagement with an associated lower valve seat 18 by its plunger spring 20. Fluid that may enter the chamber 14 of the valve A through the inlet passageway associated with its upper valve seat 18. Hence valve A is designated normally open. However, the lower valve seat 18 of valve B defines the inlet passageway for valve B and since this passageway is normally closed when solenoid B is deenergized valve B is designated normally closed.

When solenoid A is energized, the plunger assembly 16A moves upwardly to close the passageway associated with its upper valve seat 18. Since each plunger 90 is loosely connected to its associated plunger arm 92 by a shank 94, it will be evident that operation of solenoid A raises the associated plunger 90 against biasing force exerted by its plunger spring 20, however, the plunger arm 92 is urged upwardly towards seating engagement with the upper valve seat 18 by the spring 100A. Since the upper valve seat 18 of valve A defines a fluid inlet passageway, the cartridge spring 100A must exert sufficient biasing force to urge the plunger arm 92 into seat engagement with the upper valve seat against incoming fluid pressure. However, normally closed valve B is maintained in closed position against the pressure of incoming fluid by the plunger spring 20. Energization of solenoid B opens valve B. Hence the cartridge spring 100B is not required to hold its plunger arm 92 in a seated or closed position against the pressure of fluid entering the valve B and it is for this reason that the cartridge spring 100B may exert a lesser biasing force than the spring 100A.

The valve cartridge 30, the two plunger assemblies 16A and 16B and the springs 20, 20 and 100A and 100B associated therewith comprise a cartridge assembly, shown in FIG. 5. The latter assembly is releasably retained in assembled relation with the body assembly by the retaining screws 82, 82. It should be noted that the cartridge assembly may be removed from the valve body 28 while the valve assembly 10 is mounted in fixed position in an associated system. To rebuild the valve 10 is merely necessary to shut off the supply of air or hydraulic fluid to the valve, remove the two retaining screws 82, 82, drop the old cartridge assembly, replace it with a new one, replace the retaining screws, and restore the fluid supply source. The electrical and plumbing lines do not have to be disconnected to perform the latter operations. Thus, the valve 10 may be rebuilt, in place, at a fraction of its original cost by merely replacing the cartridge assembly.

Considering now the operation of the valve assembly 10, the manner in which the various ports 42A, 42B and 44A, 44B are interconnected when both solenoids are deenergized and when either and both solenoids are energized is illustrated schematically in FIGS. 7–10. It will be understood that the operational characteristics of the valve 10 may be altered by substituting for the plate 24 another transfer and metering plate which has different passageway configurations and providing cartridge springs which exert appropriate biasing force. Thus, if the transfer and metering plate is arranged so that both valve A and valve B are normally closed 6 ounce cartridge springs may, for example, be used in both valves. However, if both valves are to be normally open, two 20 ounce cartridge springs may be utilized. The specific spring characteristics may vary and will, of course, be determined by the operational pressures to which the valve is to be subjected.

I claim:

1. A solenoid actuated control valve comprising a body assembly having a chamber therein, a pair of opposing valve seats in said chamber, a solenoid mounted on said body assembly, an axially elongated plunger assembly supported for axially reciprocal movement in said chamber and including an axially elongated plunger axially movable from one to another position in response to energization of said solenoid and a rigid plunger arm extending radially outwardly beyond said plunger and having a pair of seating surfaces on opposite sides thereof radially outwardly spaced from said plunger, each of said seating surfaces aligned with an associated one of said valve seats, one of said seating surfaces engaging and closing one of said valve seats when said plunger is in its one position, the other of said seating surfaces engaging and closing the other of said valve seats when said plunger is in its other position, and means for biasing said plunger to and normally retaining it in its one position and yieldably resisting axial movement of said plunger to its other position on energization of said solenoid.

2. A solenoid actuated control valve as set forth in claim 1 wherein said plunger assembly includes a plurality of parts, one of said parts comprises said plunger, and another of said parts comprises said plunger arm.

3. A solenoid actuated control valve as set forth in claim 2 wherein said plunger arm is disposed at one end of said plunger.

4. A solenoid actuated control valve as set forth in claim 2 wherein said one part is made from one material and said other part is made from another material.

5. A solenoid actuated control valve as set forth in claim 2 wherein said biasing means comprises a first spring acting between said plunger and said body assembly and said plunger assembly includes a second spring acting between said body assembly and said plunger arm for exerting biasing force on said plunger assembly in the direction of said other position.

6. A solenoid actuated control valve as set forth in claim 2 wherein said plunger and said plunger arm are loosely connected in coaxial end-to-end relation for axial movement relative to each other.

7. A solenoid actuated control valve as set forth in claim 6 wherein one of said parts has a projection and the other of said parts has a bore receiving said projection therein, said projection and said bore cooperating to maintain said parts in loosely connected relation.

8. A solenoid actuated control valve as set forth in claim 1 wherein said chamber is defined by a generally cylindrical plunger bore and another generally cylindrical bore at one end of said plunger bore communicating with said plunger bore and axially parallel thereto and radially offset therefrom.

9. A solenoid actuated control valve as set forth in claim 8 wherein said valve seats are located at axially opposite ends of said other bore.

10. A solenoid actuated control valve as set forth in claim 8 wherein said plunger comprises a generally cylindrical plunger supported for axial sliding movement in said plunger bore and said plunger arm is generally disposed within said other bore.

11. A solenoid actuated control valve as set forth in claim 10 wherein said body assembly includes a valve body which defines said other bore and an axially elongated sleeve attached to said valve body which at least partially defines said plunger bore and said solenoid coaxially surrounds said sleeve.

12. A solenoid actuated control valve as set forth in claim 1 wherein said body assembly includes a body member having fluid ports opening exteriorly thereof and a bore opening outwardly through said body member and partially defining said chamber, one of said valve seats being disposed on said body member, a cartridge member received in and providing a closure for said bore and further defining said chamber, the other of said valve seats being disposed on said cartridge member, means defining one fluid passageway communicating with one of said ports and opening through the valve seat on said body member to provide one fluid flow path between said chamber and said one port, and means defining another fluid passageway communicating with another of said ports and opening through the valve seat seat on said cartridge to provide another fluid flow path between said chamber and said other port.

13. A solenoid actuated control valve as set forth in claim 12 wherein each of said valve seats comprises an insert carried by an associated one of said members.

14. A solenoid actuated control valve as set forth in claim 12 wherein said cartridge member, said plunger assembly, and said biasing means comprises a cartridge assembly which may be removed as a unit from said body member.

15. A solenoid actuated control valve as set forth in claim 14 including means for releasably retaining said cartridge assembly in assembled relation with said body member.

16. A solenoid actuated control valve as set forth in claim 15 including means for mounting said body member in fixed position relative to an associated mounting surface and wherein said cartridge assembly may be removed as a unit from said body member while said body member is mounted in said fixed position by said mounting means.

17. A solenoid actuated control valve as set forth in claim 12 wherein said biasing means comprises a first spring acting between said plunger assembly and an associated one of the members which comprise said body member and said cartridge member.

18. A solenoid actuated control valve as set forth in claim 17 including a second spring acting between said plunger assembly and the other of said members for exerting biasing force on said plunger assembly in the direction of said other position and wherein said first spring exerts greater biasing force on said plunger assembly than said second spring.

19. A solenoid actuated control valve as set forth in claim 18 wherein said first spring comprises a compression spring which acts between said plunger assembly and said body member and said second spring comprises a compression spring which acts between said plunger assembly and said cartridge member.

20. A solenoid actuated control valve as set forth in claim 12 wherein one of said members has a pair of plunger arm guides extending in an axial direction therefrom and said plunger arm is received between and restrained against angular movement by said guides.

21. A solenoid actuated control valve as set forth in claim 12 wherein said plunger assembly has an axially projecting guide member and cartridge member has an axially extending guide bore slidably receiving said guide member therein.

22. A solenoid actuated control valve as set forth in claim 21 wherein said plunger assembly includes a spring received in said guide bore for biasing said plunger assembly in the direction of said other position.

23. A solenoid actuated control valve as set forth in claim 22 wherein said guide member comprises a tube and said spring is partially received within said tube.

24. A solenoid actuated control valve as set forth in claim 12 wherein the first mentioned one valve seat is disposed on said cartridge member and the first mentioned other valve seat is disposed on said body member.

* * * * *